(12) United States Patent
Simmons

(10) Patent No.: US 11,451,843 B2
(45) Date of Patent: Sep. 20, 2022

(54) AUTHENTICATED CONTENT DISCOVERY

(71) Applicant: Microsoft Technology Licensing, LLC, Redmond, WA (US)

(72) Inventor: John C. Simmons, North Bend, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/322,816

(22) Filed: May 17, 2021

(65) Prior Publication Data
US 2021/0274233 A1   Sep. 2, 2021

Related U.S. Application Data

(63) Continuation of application No. 16/415,376, filed on May 17, 2019, now Pat. No. 11,012,729, which is a continuation of application No. 15/262,872, filed on Sep. 12, 2016, now Pat. No. 10,306,281, which is a continuation of application No. 12/898,553, filed on Oct. 5, 2010, now Pat. No. 9,445,139.

(51) Int. Cl.
| | |
|---|---|
| *H04N 21/258* | (2011.01) |
| *H04N 21/482* | (2011.01) |
| *H04N 21/6334* | (2011.01) |
| *H04N 21/235* | (2011.01) |
| *H04N 21/472* | (2011.01) |

(52) U.S. Cl.
CPC ..... *H04N 21/25816* (2013.01); *H04N 21/235* (2013.01); *H04N 21/472* (2013.01); *H04N 21/482* (2013.01); *H04N 21/4821* (2013.01); *H04N 21/63345* (2013.01)

(58) Field of Classification Search
CPC ....... H04N 21/63345; H04N 21/25816; H04N 21/472; H04N 21/4821; H04N 21/235
See application file for complete search history.

(56) References Cited

U.S. PATENT DOCUMENTS

| | | | |
|---|---|---|---|
| 7,134,134 B2 * | 11/2006 | Fries | H04N 21/47 380/231 |
| 7,367,887 B2 * | 5/2008 | Watabe | A63F 13/537 463/36 |
| 7,853,974 B2 * | 12/2010 | Wehmeyer | H04N 21/4345 725/50 |
| 8,051,172 B2 * | 11/2011 | Sampson | H04L 51/212 725/40 |

(Continued)

*Primary Examiner* — Jason Salce
(74) *Attorney, Agent, or Firm* — NovoTechIP International PLLC

(57) ABSTRACT

Embodiments are disclosed herein that relate to facilitating the discovery of authenticated content from a variety of sources. One embodiment provides a method comprising receiving a plurality of authentication tokens from the media presentation device, where each of the plurality of authentication tokens represents an established authenticated relationship between a user and a corresponding content source. The method further comprises receiving a request from the media presentation device for an electronic programming guide and sending the electronic programming guide to the media presentation device, where the electronic programming guide comprises a listing of content from a plurality of content sources corresponding to the plurality of authentication tokens.

15 Claims, 4 Drawing Sheets

(56) References Cited

U.S. PATENT DOCUMENTS

| | | | |
|---|---|---|---|
| 8,156,516 B2* | 4/2012 | McClain | G06F 21/604 |
| | | | 725/1 |
| 2002/0019980 A1* | 2/2002 | Kikinis | H04N 21/41265 |
| | | | 348/E5.103 |
| 2002/0118954 A1* | 8/2002 | Barton | H04N 21/4335 |
| | | | 725/48 |
| 2002/0129367 A1* | 9/2002 | Devara | H04N 21/4622 |
| | | | 725/47 |
| 2002/0133412 A1* | 9/2002 | Oliver | G06Q 30/02 |
| | | | 705/26.8 |
| 2003/0014546 A1* | 1/2003 | Kikinis | H04N 21/4627 |
| | | | 348/E5.002 |
| 2004/0083489 A1* | 4/2004 | Bansal | H04N 21/23617 |
| | | | 348/E7.054 |
| 2004/0088333 A1* | 5/2004 | Sidman | H04L 63/08 |
| 2005/0262253 A1* | 11/2005 | Li | H04L 65/765 |
| | | | 709/231 |
| 2009/0253415 A1* | 10/2009 | Walker | H04N 21/47 |
| | | | 725/39 |
| 2009/0293081 A1* | 11/2009 | Pirani | H04N 21/4334 |
| | | | 707/999.003 |
| 2009/0320114 A1* | 12/2009 | Guo | G06F 21/606 |
| | | | 726/8 |
| 2009/0327006 A1* | 12/2009 | Hansan | G06Q 10/10 |
| | | | 705/317 |
| 2009/0328123 A1* | 12/2009 | Alkove | H04N 21/4627 |
| | | | 725/114 |
| 2010/0017824 A1* | 1/2010 | Malik | H04N 21/44224 |
| | | | 725/40 |
| 2010/0333142 A1* | 12/2010 | Busse | H04N 21/6582 |
| | | | 725/47 |
| 2011/0103265 A1* | 5/2011 | Dilipkumar Saklikar | H04L 63/0815 |
| | | | 370/352 |

* cited by examiner

AUTHENTICATED CONTENT DISCOVERY

CROSS REFERENCE TO RELATED APPLICATIONS

This application is a continuation of U.S. patent application Ser. No. 16/415,376, filed on May 17, 2019, which is a continuation of U.S. patent application Ser. No. 15/262,872, now granted as U.S. Pat. No. 10,306,281, filed on Sep. 12, 2016, which is a continuation of U.S. patent application Ser. No. 12/898,553, now granted as U.S. Pat. No. 9,445,139, filed on Oct. 5, 2010, all of which are entitled "AUTHENTICATED CONTENT DISCOVERY," the entire disclosures of each of which are hereby incorporated herein by reference.

BACKGROUND

A consumer of media content may use a variety of media presentation devices for content consumption, such as a desktop computer, laptop computer, mobile communication device, portable media player, and/or television. Further, such a consumer may receive content from a variety of sources, including but not limited to multichannel video program distributors (MVPDs) such as cable providers, direct broadcast providers, satellite television providers, as well as broadband video content providers that provide content over a computer network such as the Internet.

In the case of MVPD-delivered content, the MVPD acts as a gatekeeper that maintains relationships with content producers and controls user access to the content. In contrast, in the case of some computer network-accessed content such as broadband video content, a user may utilize a network browser to freely search for content. Currently, users may discover content available from a MVPD via an electronic programming guide (EPG) provided by the MVPD via a set top box or the like. In contrast, users may discover content available from non-MVPD sources by a variety of other methods. For example, a user may be provided with different software applications that each allows the user to discover content available from a provider associated with that application. Further, in some cases, a MVPD may establish relationships with Internet-accessed content so that the MVPD also acts as a gatekeeper for such broadband video content.

SUMMARY

Various embodiments are disclosed herein that relate to facilitating the discovery of authenticated content from a variety of sources by providing an electronic programming guide to a media presentation device. One disclosed embodiment provides a method comprising receiving a plurality of authentication tokens from the media presentation device, where each of the plurality of authentication tokens represents an established authenticated relationship between a user and a corresponding content source. The method further comprises receiving a request from the media presentation device for an electronic programming guide and sending the electronic programming guide to the media presentation device, where the electronic programming guide comprises a listing of content from a plurality of content sources corresponding to the plurality of authentication tokens.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As mentioned above, a consumer of media content may access media content from a variety of different media presentation devices, some of which may not be connectable to a traditional set top box. As such, MVPDs such as multiple system operators (MSOs), telecommunication operators (Telcos), etc. may wish to distribute content over the Internet, yet have consumers authenticate their right to that content. Thus, such MVPDs may wish to adopt a particular authentication method that supports content distribution to a variety of media presentation devices such as personal computers, mobile communication devices, Internet-enabled televisions, etc. Such authentication methods also may allow for authenticated content delivery from non-MVPD sources, such as broadband video sources accessed via the Internet. Much of this content may be "long tail," meaning that the content may appeal to a demographic which may be narrower than that of a typical broadcast lineup.

Due to the focused interest of such a broadcast, this narrower demographic may be desirable for targeting with contextual advertising. However, proliferation of such content may create complications within content discovery and advertisement provision, in particular on media presentation devices such as Internet-enabled televisions and mobile communication devices.

Therefore, embodiments are disclosed herein that relate to providing an electronic programming guide to a media presentation device within a computer network media consumption environment for such broadband network-delivered, authenticated content. Further, such a computer network media consumption environment may allow for targeted advertising based on a user's authenticated relationships with various content sources.

Figure 1:
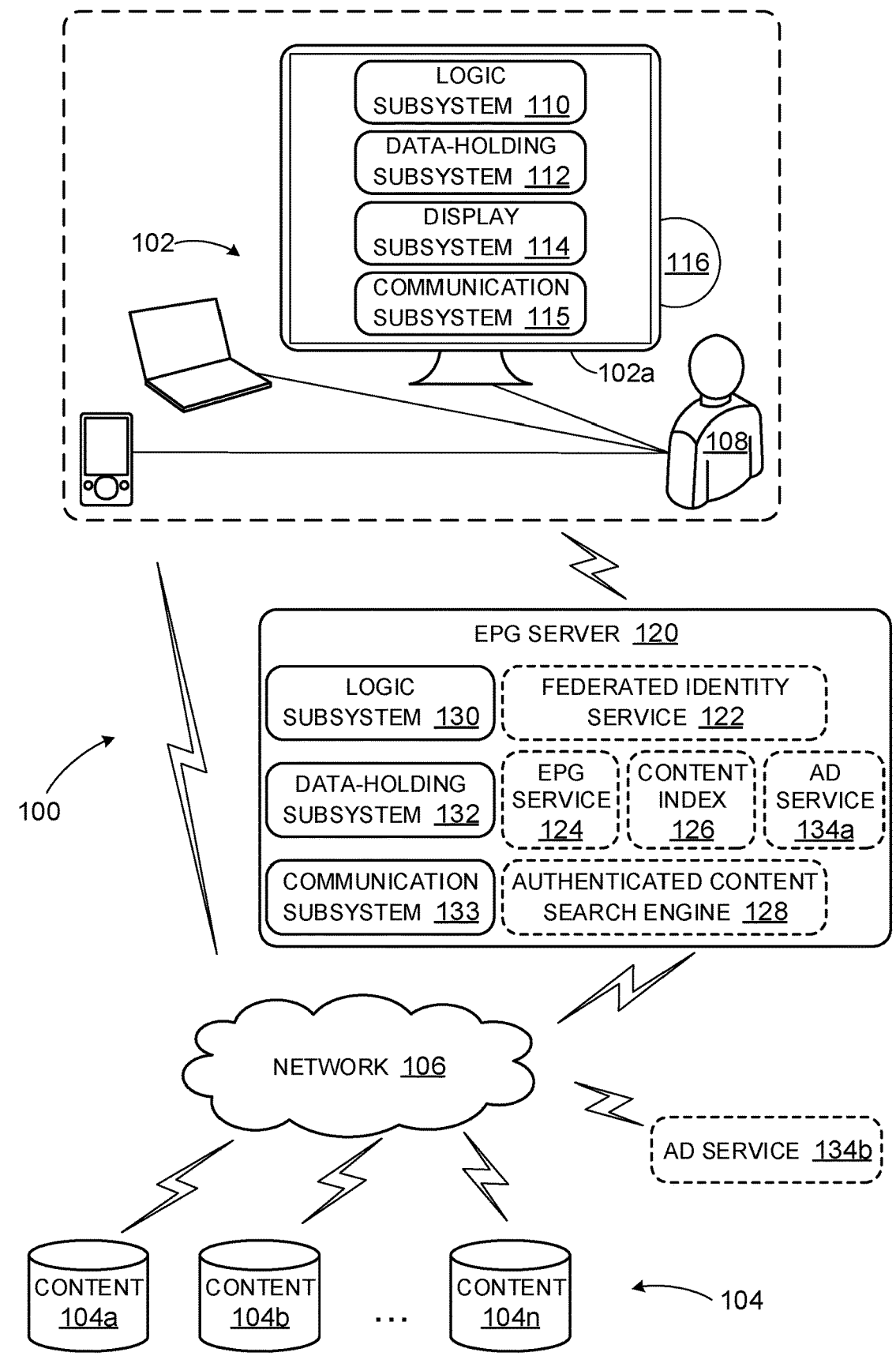
FIG. 1 shows an example computer network media consumption environment in accordance with an embodiment of the present disclosure.

FIG. 1 shows an example computer network media consumption environment 100 including a plurality of media presentation devices 102 configured to visually present content. As nonlimiting examples, media presentation devices 102 may include televisions and other display devices; computing devices such as desktop computers, laptop computers, notebook computers, notepad computers, etc.; mobile communication devices such as smart phones; portable media players; and other suitable devices. The content consumed by such media presentation devices 102 may be received from any suitable source, such as content sources 104 accessible via a network such as network 106. Content sources 104 may represent any suitable content sources, including but not limited to a computer network content source 104a (e.g., accessible by the Internet) and a broadcast content source 104b (e.g., satellite or cable provider), for example. As such, media presentation devices 102 may consume traditional broadcast and/or computer network-delivered content.

As mentioned above, consumption of the content from content sources 104 may be within an environment in which users are authenticated by a media content source prior to accessing and consuming media content from that source. In such a case, a user 108 may register with one or more such content sources 104 to receive authenticated content via media presentation devices 102. An example authentication-authorization environment is described in more detail hereafter with reference to FIG. 4.

When registering with a particular content source, the content source may provide to the media presentation device an authentication token. As an example, user 108 may register example media presentation device 102a with example content source 104n and in response, receive an authentication token from content source 104n representing the authenticated relationship. The term "authentication token" as used herein signifies any representation that the user has an authenticated relationship with that content source. The authentication token may contain any suitable information, including but not limited to information about media presentation device 102a, user 108 of media presentation device 102a, and/or content source 104n from which the authentication token was received. It should be appreciated that user 108 may register additional media presentation devices 102 (e.g., media presentation device 102b of FIG. 3) with other content sources 104 (e.g., content source 104b) and thereby receive additional authentication tokens. It should be further appreciated that in some embodiments, a content delivery source may be distinct from an authentication service. As an example, an authentication token may correspond to a video club (A), which gives the user rights to videos from multiple sources (X, Y and Z). In such a case, trust relationships exist between A-X, A-Y, and A-Z. As such, the "authentication" in effect comes from X, Y or Z, but is mediated by A.

An nonlimiting example of a possible use scenario, a user may register with an online account associated with an online sports magazine service in order to view authenticated content associated with the sports magazine, such as player interviews, premium programming, playoff games, etc. As another example, a user may register with an online gaming service to receive authenticated content from the gaming service, such as games and related media content. As yet another example, a user may register with an online movie service to download and/or stream movies. It should be appreciated that these examples illustrate just a few examples of authenticated content sources, and are not intended to be limiting in any way.

Media presentation devices 102, such as example media presentation device 102a, may each further include a logic subsystem 110, a data-holding subsystem 112, a display subsystem 114, and a communication subsystem 115. Media presentation device 102a may optionally include other components not shown in FIG. 1, such as user input devices (e.g., keyboards, mice, game controllers, cameras, microphones, and/or touch screens).

Logic subsystem 110 may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Data-holding subsystem 112 may include one or more physical devices configured to hold data and/or instructions executable by logic subsystem 110 to implement the herein described methods and processes. When such methods and processes are implemented, the state of data-holding subsystem 112 may be transformed (e.g., to hold different data).

Data-holding subsystem 112 may include removable media and/or built-in devices. For example, data-holding subsystem 112 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 112 may include devices with one or more of the following characteristics: volatile, nonvolatile, dynamic, static, read/write, read-only, random access, sequential access, location addressable, file addressable, and content addressable. In some embodiments, logic subsystem 110 and data-holding subsystem 112 may be integrated into one or more common devices, such as an application specific integrated circuit or a system on a chip.

FIG. 1 also shows an aspect of the data-holding subsystem in the form of removable computer-readable storage media 116, which may be used to store and/or transfer data and/or instructions executable to implement the herein described methods and processes. Removable computer-readable storage media 116 may take the form of CDs, DVDs, HD-DVDs, Blu-Ray Discs, EEPROMs, flash memory drives, and/or floppy disks, among others.

Display subsystem 114 may be used to present a visual representation of data held by data-holding subsystem 112. As the herein described methods and processes change the data held by the data-holding subsystem, and thus transform the state of the data-holding subsystem, the state of display subsystem 114 may likewise be transformed to visually represent changes in the underlying data. Display subsystem 114 may include one or more display devices utilizing virtually any type of technology. Such display devices may be combined with logic subsystem 110 and/or data-holding subsystem 112 in a shared enclosure, or such display devices may be peripheral display devices.

Communication subsystem 115 may be configured to communicatively couple with one or more other computing devices, such as an EPG server 120. Communication subsystem 115 may include wired and/or wireless communication devices compatible with one or more different communication protocols. As nonlimiting examples, communication subsystem 115 may be configured for communication via a wireless telephone network, a wireless local area network, a wired local area network, a wireless wide area network, a wired wide area network, and/or any other suitable network or combination of networks.

EPG server 120 is configured to provide an electronic programming guide (EPG) to media presentation devices 102. It should be appreciated that depicted EPG server 120 may represent one or more server devices in communication with one another. As such, it will be understood the various services and features described herein as being performed by EPG server may be implemented on two or more separate devices in some embodiments. The EPG provided shows a list of authenticated content available to user 108 based on the user's stored digital credentials (e.g., authentication tokens). As such, the EPG allows user 108 to access, select, and discover authenticated content from various potentially unrelated sources via a common user interface. In some embodiments, the EPG may present a list of content available via both a computer network (e.g., broadband video sources) and broadcast sources. Likewise, in some embodiments, such an EPG may be configured to update continuously, upon user request, or at any other suitable time.

Providing such an EPG for authenticated content offers user 108 a convenient method for discovering content that is similar to the familiar cable or satellite broadcast television content discovery and selection paradigm. In the traditional cable or satellite model, a user operates within a "walled garden" of content wherein a carrier or service provider controls applications, content, media platforms, etc., and thus restricts access to non-approved content sources. However, the EPG provided by EPG server 120 allows user 108 to access to both computer network and broadcast content. As such, the user 108 is not restricted by a walled garden content consumption environment. Rather, user 108 may access via the EPG any authenticated content with which they are registered through EPG server 120. This is in contrast to the use of separate applications to discover content available from different sources, which allows a user to see content available from only a single source.

EPG server 120 may be configured to provide the EPG in any suitable manner. In some embodiments, EPG server 120 may include a federated identity service 122 configured to federate various items of information about a user to be used in providing the EPG to the user. For example, federated identity service 122 may federate information regarding one or more media presentation devices, such as example media presentation devices 102a and 102b, as well as authentication tokens received by the user via registered devices when registering with any of the content sources 104. In this way, federated identity service 122 may then provide media presentation device 102a and/or 102b with an EPG based on the authentication tokens received from any of the user's media presentation devices 102 regardless of which of the media presentation devices 102 was utilized when registering with the content sources. It is to be appreciated that a "service", as used herein, may be an application program executable across multiple user sessions and available to one or more system components, programs, and/or other services, and may run on a server responsive to a request from a client.

EPG server 120 may further include an EPG service 124. EPG service 124 is configured to generate the EPG based on the authentication tokens received from media presentation devices 102. As an example, in some embodiments, EPG service 124 may compare the authentication tokens to a collection of authenticated content available from known content sources utilizing authentication, represented as content index 126 in FIGS. 1 and 3, to determine the authenticated content with which user 108 is permitted access. In this way, federated identity service 122 may cross-correlate user digital identities of the authentication tokens to content index 126 and generate a personalized EPG for user 108 based, for example, upon the cross-product of aggregated, federated identities and authenticated content.

In some embodiments, EPG server 120 may be further configured to perform network searching, via authenticated content search engine 128, to discover additional content sources that utilize authentication. EPG server 120 further may update content index 126 with such newly discovered content sources. Further, EPG server 120 may additionally or alternatively receive submissions of authenticated content directly from content sources 104 (e.g., from developers).

EPG server 120 may further include a logic subsystem 130 and a data-holding subsystem 132. As described above with reference to example media presentation device 102a, logic subsystem 130 may be configured to execute instructions, such as instructions stored on a data-holding subsystem 132 to perform the various tasks disclosed herein related to the provision of EPGs and/or advertising content and/or services.

EPG server 120 may further include a communication subsystem 133 configured to communicatively couple with one or more other computing devices, such as media presentation devices 102. As described above with reference to media presentation device 102a, communication subsystem 133 may include wired and/or wireless communication devices compatible with one or more different communication protocols.

Continuing with FIG. 1, in addition to providing an EPG, EPG server 120 may further provide advertising, via an ad service 134a, based on the authenticated content sources with which user 108 is registered. In some embodiments, this targeted advertising may be based on one or more of the authentication tokens associated with the user in the federated identity service 122, and/or on user-descriptive metadata ("identity metadata") aggregated via the authentication tokens. Such user-descriptive metadata may include, for example, demographic and/or affinity data based upon the subject matter of broadband video channels with which the user is authenticated. In other embodiments, EPG server 120 may provide aggregative identity metadata to an external advertising service, such as ad service 134b, for the provision of advertising content.

Figure 2:
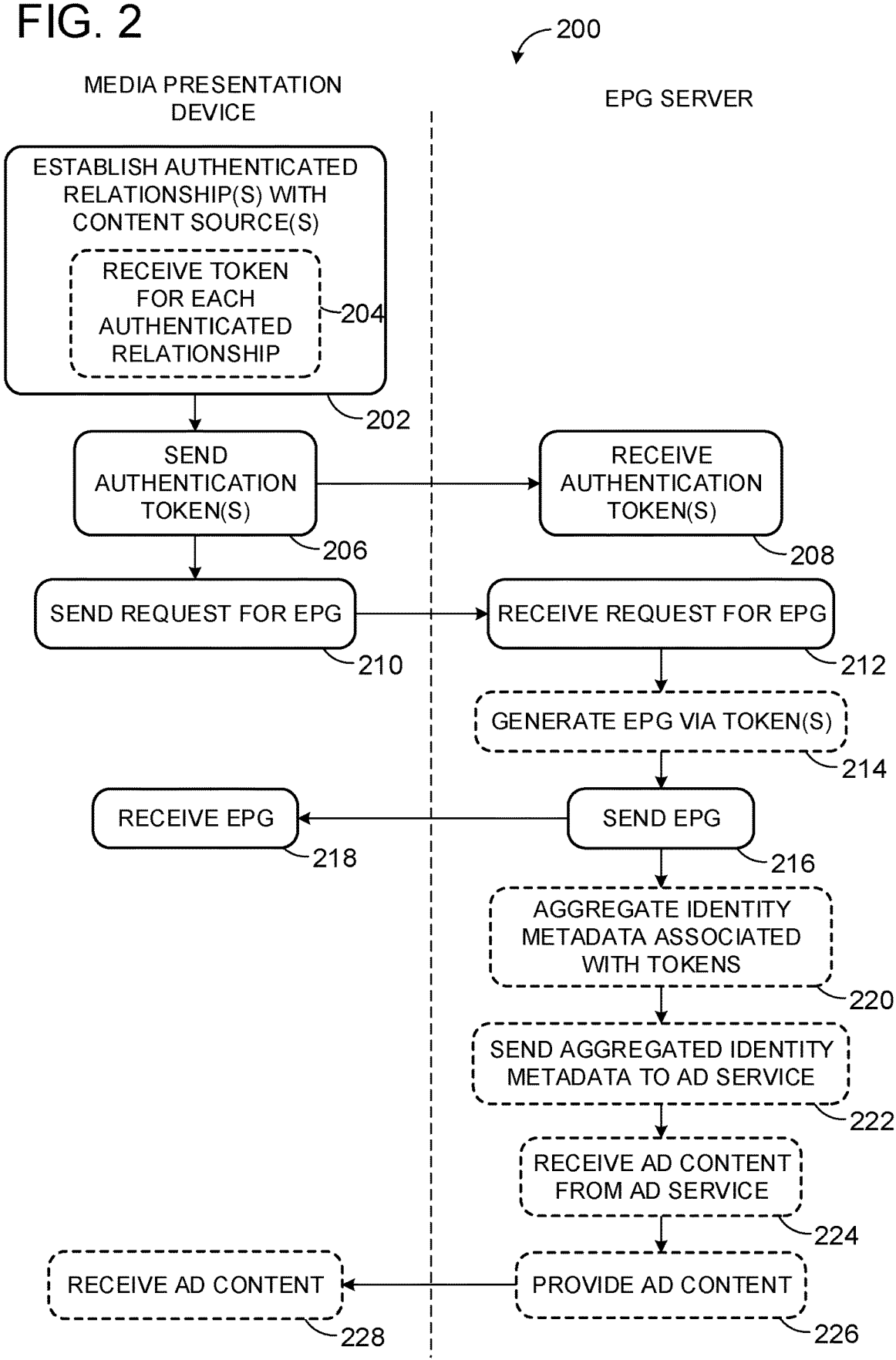
FIG. 2 shows a flow diagram of an embodiment of a method of providing an electronic programming guide to a media presentation device.

FIG. 2 shows an embodiment of a method 200 of providing an EPG to a media presentation device. At 202, the media presentation device establishes authenticated relationships with one or more content sources, including but not limited to broadcast sources and/or broadband sources or other computer network-available sources. In response to establishing each authenticated relationship, the media presentation device receives an authentication token, as indicated at 204, representing an established authenticated relationship between the user and the corresponding content source.

At 206, the media presentation device sends the authentication tokens to a federated identity service associated with an EPG server. Accordingly, at 208, the EPG server receives the authentication tokens from the media presentation device.

At 210, the media presentation device sends a request to the EPG server for an EPG. Accordingly, at 212, the EPG server receives the request from the media presentation device for the EPG, and at 214, the EPG server generates the EPG via the authentication tokens. For example, the EPG server may compare the authentication tokens to an authenticated content index or other suitable collection of known content sources utilizing authentication in order to determine the authenticated content sources with which the user is registered. Upon determining such content, the EPG server may then generate an EPG comprising a list of content available from the authenticated sources. At 216, the EPG server sends the EPG to the media presentation device, and at 218 the media presentation device receives the EPG.

In some embodiments, the media presentation device may provide additional authentication tokens to the EPG server as the user registers with additional authenticated content sources. In such a case, upon receiving the additional authentication tokens from the media presentation device, the EPG server may send an updated EPG to the media presentation device, either automatically upon receipt of the additional authentication tokens, or upon receiving a request from the media presentation device for an updated EPG. It will be understood that such an updated EPG includes listings of content from additional content sources corresponding to the additional authentication tokens.

The media presentation device may be just one of several media presentation devices associated with the user. As such, method 200 may further include the EPG server receiving additional requests from other media presentation devices associated with the user. These additional media presentation devices may also be registered with the federated identity service. As such, upon receiving a request for an EPG from one of such devices, method 200 may include the EPG server sending the EPG to that device.

Continuing with FIG. 2, in some embodiments, the EPG server may be further configured to provide advertising content to the media presentation device. In such embodiments, method 200 proceeds to 220, wherein the EPG server aggregates identity metadata associated with the user based on the authentication tokens. For example, metadata may be determined based upon an identity of the authenticated content sources represented by the authentication tokens. In the case of broadband video content sources, such sources may have a sufficiently narrow focus that highly descriptive metadata may be determined from the identity of the authenticated content source.

At 222, the EPG server provides the aggregated identity metadata to an advertising service. Such an advertising service may be associated the EPG server itself, or alternatively, may be a third-party advertising service. At 224, the EPG server receives advertising content from the advertising service, wherein the advertising content is selected based on the aggregated identity metadata. At 226, the EPG server provides the advertising content to the media presentation device, and, at 228, the media presentation receives the advertising content. It will be understood that the advertising content also may be provided directly by the advertising service.

Figure 3:
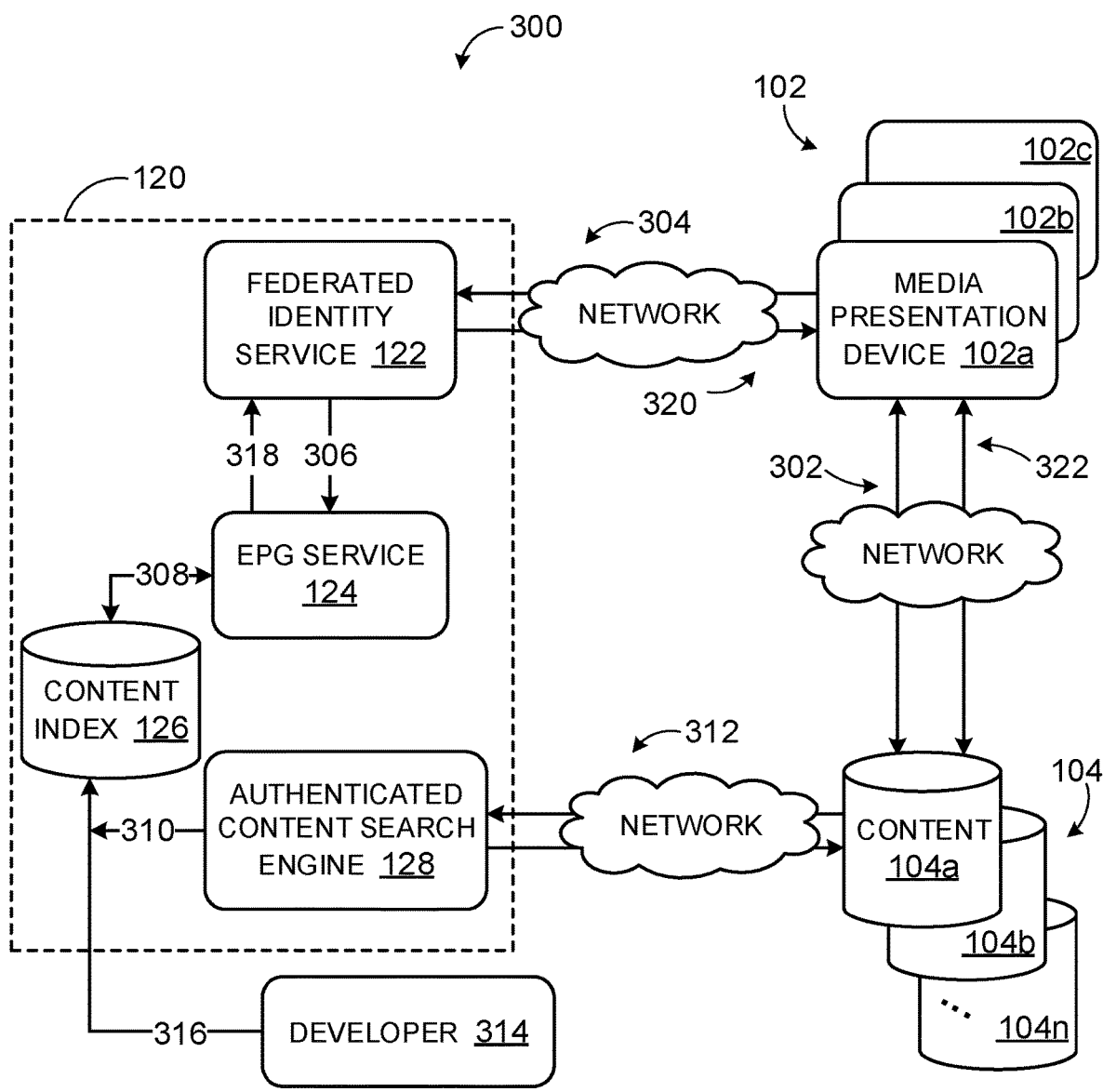
FIG. 3 schematically shows an example workflow diagram within the computer network media consumption environment embodiment of FIG. 1.

Turning now to FIG. 3, FIG. 3 schematically shows an example workflow diagram 300 illustrating an embodiment of a method for providing an EPG to media presentation devices 102 within computer network media consumption environment 100 of FIG. 1. As shown at 302, one or more media presentation devices 102 may register with one or more content sources 104, and in response, receive an authentication token for each authenticated relationship with a content source. Such communication may occur over a network 106, such as the Internet or any other suitable network.

Continuing, a media presentation device, such as example media presentation device 102a, may register with federated identity service 122, and may then pass the authentication tokens stored on media presentation device 102a to federated identity service 122, as shown at 304. Other media presentation devices 102 associated with user 108 also may register with federated identity service 122 and pass their authentication tokens to federated identity service 122. Federated identity service 122 may then federate all authentication tokens associated with user 108.

Upon receiving the authentication tokens, federated identity service 122 may pass the authentication tokens to EPG service 124, as illustrated at 306. EPG service 124 may then cross-correlate the authentication tokens with a listing of content at content index 126, as shown at 308, so as to determine with which content sources 104 the user is authenticated.

In some cases, as shown at 310, content index 126 may store authenticated content located via an authenticated content search engine 128 configured to crawl for authenticated content of content sources 104, as shown at 312. Further, in some embodiments, a developer 314 may be able to submit content directly to content index 126, as shown at 316.

Upon determining the authenticated content sources associated with user 108, EPG service 124 then produces an EPG that lists content available from the authenticated content sources associated with user 108, and provides federated identity service 122 with the EPG, as shown at 318. At 320, federated identity service 122 provides the EPG to media presentation device 102a. Upon receiving the EPG, media presentation device 102a may select content from the EPG for consumption. Such content then may be received via normal distribution channels. For example, broadband video content selected from the EPG may be received directly over a network, rather than through EPG server 120.

Figure 4:
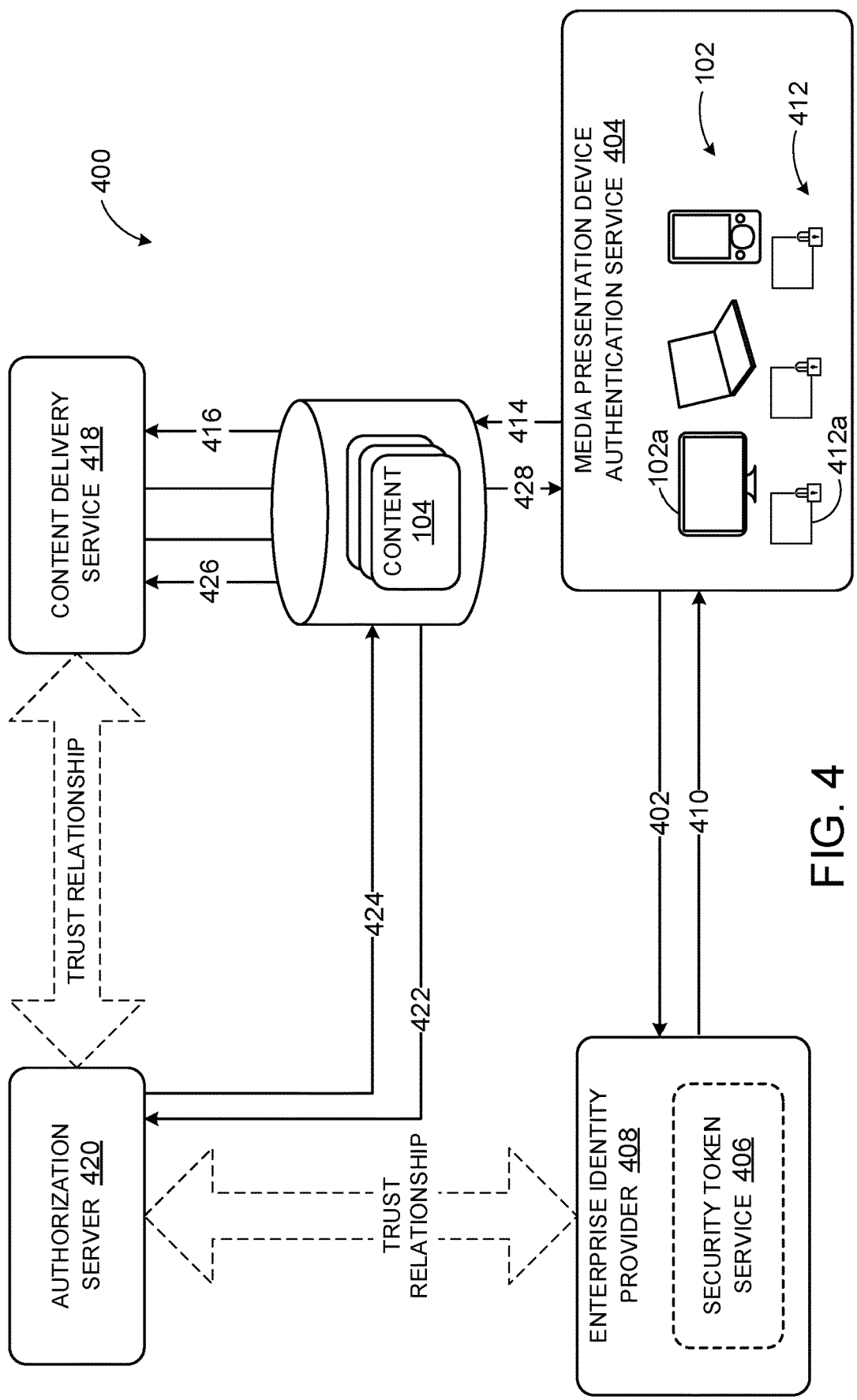
FIG. 4 schematically shows an example workflow diagram within an authentication-authorization environment in accordance with an embodiment of the present disclosure.

FIG. 4 schematically shows an example workflow diagram 400 depicting an embodiment of a method of establishing an authenticated relationship and receiving protected content within an authentication-authorization environment. As an example, media presentation devices 102 of FIG. 1 may utilize such an environment to register with content sources 104 so as to form authenticated relationships.

At 402, a media presentation device, such as example media presentation device 102a, registers and authenticates, via a media presentation device authentication service 404 (which may be first- or third-party), with a security token service 406 of an enterprise identity provider 408. At 410, an authentication token 412a is transmitted to media presentation device 102a. As a non-limiting example, the authentication token 412a may be a Security Assertion Markup Language (SAML) token. Authentication token 412a may then be stored at media presentation device 102a. It should be appreciated that other media presentation devices 102 associated with user 108 may also authenticate with security token service 406 and receive authentication tokens 412.

At 414, content from one or more content sources 104 is discovered, and user 108 selects protected content for consumption. Then, the media presentation device 102a attempts to access the protected content via a content delivery service 418, as shown at 416. The request to access the content may comprise the authentication token 412a, as well as any other suitable information.

Content delivery service 418 redirects the request, including the client-stored authentication token 412a, to an authorization server 420 with which content delivery service 418 has a trust relationship, as shown at 422. Authorization server 420 may also have a trust relationship with enterprise identity provider 408. Authorization server 420 then authenticates user 108 using authentication token 412a, and generates a user-authenticated verification code. At 424, the verification code is returned to media presentation device 102a.

The request for the content may then be redirected back to content delivery service 418, as shown at 426. The redirected request may include authentication token 412a and the verification code generated by authorization server 420. Content delivery service 418 receives the request and parses authentication token 412a and the verification code to verify authorization. Upon doing so, content delivery service 418 then transmits a license to media presentation device 102a, as shown at 428. Such a license may include, for example, a domain-bound digital rights management (DRM) license, wherein the license is bound cryptographically to a domain of a collection of media presentation devices, rather than to a specific media presentation device. Upon receiving the license at 428, media presentation device 102a then extracts a decryption key for streaming and/or download, and commences authorized playback of the protected content.

As a more specific example use scenario of such an authentication-authorization environment in conjunction with the herein-described computer network media consumption environment 100, a user may purchase a new media presentation device, such as a television. Once installed and Internet-enabled, the television may utilize discovery standards to discover federated identity service(s) already in use by the user. However, in other embodiments and/or if no federated identity services are found, the television may provide a list and/or a prompt for the user to select a popular federated identity service. As an example, the MSO or Telco used for Internet access may provide such a service. The user may then select any suitable federated identity service. As an example, the user may select a federated identity service recognized as being associated with a favorable consumer experience.

The federated identity service may discover existing credentials in the home of the user (e.g., authentication tokens on one or more media presentation devices associated with the user). However, if no such credentials can be found, then in some embodiments, the user may enter these credentials in any suitable manner, such as via a login and password, subscriber identity module (SIM) card from a mobile communication device, etc.

Using authentication methods, (e.g., Security Assertion Markup Language (SAML), OAuth 2.0, etc.) the credentials may be shared with an EPG web service associated with the federated identity service. This web service may compare the credentials of the user with a database of known authenticated content sources of Internet content. The web service then creates an EPG and provides this EPG to the user's television. Further, all devices owned by the user which are registered with the federated identity service may receive such an EPG.

In some cases, an authenticated content web crawler may continuously collect authentication content from the Internet and maintain such information in a database used by the EPG web service. Further, some sources of authenticated content may be optionally preloaded and managed in the database.

Further, where the federated identity service collects and aggregates identity metadata, an advertising provider may use this metadata to associate advertising content with authenticated content in a way personalized to the user.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of providing electronic programming guide (EPG) data to a first media presentation device comprising:
   receiving a first registration information from the first media presentation device;
   receiving an identification of a first content source from the first media presentation device;
   obtaining, from at least one of the first registration information or the identification of the first content source, a first user digital identity of a first user;
   receiving a second registration information from a second media presentation device that is different than the first media presentation device;
   receiving an identification of a second content source from the second media presentation device, the second content source differing from the first content source;
   obtaining, from at least one of the second registration information or the identification of the second content source, the first user digital identity of the first user;
   federating information regarding the first media presentation device with information regarding the second media presentation device based on the obtaining the first user digital identity from both the first and second media presentation devices;
   generating an EPG comprising content from both the first and second content sources based on the federated information; and
   providing the EPG to the first media presentation device.

2. The method of claim 1, wherein the federated information further comprises the first user digital identity.

3. The method of claim 1, wherein the receiving the identification of the second content source comprises receiving a second authentication token, the second authentication token identifying a second content, from the second content source, consumed by the first user utilizing the second media presentation device.

4. The method of claim 3, wherein the generated EPG comprises the second content.

5. The method of claim 3, wherein the federated information further comprises the second authentication token.

6. The method of claim 5, further comprising:
   providing the second authentication token to the first media presentation device, the second authentication token on the first media presentation device enabling the first user to consume the second content, from the second content source, utilizing the first media presentation device.

7. The method of claim 6, wherein the second authentication token on the first media presentation device enables authentication of the first media presentation device to the second content source.

8. The method of claim 3, wherein the second authentication token was provided to the second media presentation device by the second content source after the first user utilized the second media presentation device to establish an authenticated relationship with the second content source.

9. One or more electronic programming guide (EPG) servers, in aggregate comprising:
- one or more logic subsystems; and
- one or more data-holding subsystems, at least some of which hold instructions executable by at least some of the logic subsystems to:
  - receive a first registration information from a first media presentation device;
  - receive an identification of a first content source from the first media presentation device;
  - obtain, from at least one of the first registration information or the identification of the first content source, a first user digital identity of a first user;
  - receive a second registration information from a second media presentation device that is different than the first media presentation device;
  - receive an identification of a second content source from the second media presentation device, the second content source differing from the first content source;
  - obtain, from at least one of the second registration information or the identification of the second content source, the first user digital identity of the first user;
  - federate information regarding the first media presentation device with information regarding the second media presentation device based on the obtaining the first user digital identity from both the first and second media presentation devices;
  - generate an EPG comprising content from both the first and second content sources based on the federated information; and
  - provide the EPG to the first media presentation device.

10. The one or more EPG servers of claim 9, wherein the federated information further comprises the first user digital identity.

11. The one or more EPG servers of claim 9, wherein the receiving the identification of the second content source comprises receiving a second authentication token, the second authentication token identifying a second content, from the second content source, consumed by the first user utilizing the second media presentation device.

12. The one or more EPG servers of claim 11, wherein the generated EPG comprises the second content.

13. The one or more EPG servers of claim 11, wherein the federated information further comprises the second authentication token.

14. The one or more EPG servers of claim 13, wherein at least some of the one or more data-holding subsystems hold further instructions executable by at least some of the logic subsystems to:
- provide the second authentication token to the first media presentation device, the second authentication token on the first media presentation device enabling the first user to consume the second content, from the second content source, utilizing the first media presentation device.

15. The one or more EPG servers of claim 14, wherein the second authentication token on the first media presentation device enables authentication of the first media presentation device to the second content source.

* * * * *